United States Patent
Enomoto et al.

(12)
(10) Patent No.: US 6,897,919 B2
(45) Date of Patent: May 24, 2005

(54) LIQUID-CRYSTAL DISPLAY DEVICE HAVING A SHIELD SHIELDING AN ELECTROMAGNETIC WAVE RADIATED FROM ONE OF A DRIVER AND AN ELECTRODE LEAD-OUT LINE

(75) Inventors: Hiromi Enomoto, Kawasaki (JP); Noriyuki Ohashi, Kawasaki (JP); Hong Yong Zhang, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 613 days.

(21) Appl. No.: 09/930,417

(22) Filed: Aug. 11, 2001

(65) Prior Publication Data

US 2002/0101553 A1 Aug. 1, 2002

(30) Foreign Application Priority Data

Jan. 31, 2001 (JP) .................................. 2001-024594

(51) Int. Cl.⁷ ............................................. G02F 1/1335
(52) U.S. Cl. ....................................................... 349/106
(58) Field of Search ............................ 349/106, 12, 42; 345/92

(56) References Cited

U.S. PATENT DOCUMENTS 6,219,113 B1 * 4/2001 Takahara ...................... 349/42
6,628,355 B1 * 9/2003 Takahara .................... 349/106

FOREIGN PATENT DOCUMENTS

| JP | 05150214 A | 6/1993 |
| JP | 06258660 A | 9/1994 |
| JP | 07294880 A | 11/1995 |
| JP | 11052428 A | 2/1999 |
| JP | 11212115 A | 8/1999 |
| JP | 2000275676 A | 10/2000 |

* cited by examiner

Primary Examiner—John F. Niebling
Assistant Examiner—Andre' Stevenson
(74) Attorney, Agent, or Firm—Greer, Burns & Crain, Ltd.

(57) ABSTRACT

A liquid-crystal display device is provided. The liquid-crystal display device comprises a first substrate having a pixel electrode, a signal line, a scanning line, and a driver driving one of the signal line and the scanning line, a second substrate opposing the first substrate and having a common electrode, a liquid-crystal layer formed between the pixel electrode and the common electrode, and a first shield placed opposite the driver so as to shield an electromagnetic wave radiated from the driver.

17 Claims, 15 Drawing Sheets

LIQUID-CRYSTAL DISPLAY DEVICE HAVING A SHIELD SHIELDING AN ELECTROMAGNETIC WAVE RADIATED FROM ONE OF A DRIVER AND AN ELECTRODE LEAD-OUT LINE

BACKGROUND OF THE INVENTION

1. Field of the Invention

The present invention generally relates to a liquid-crystal display device, and more particularly, to a liquid-crystal display device displaying an image on a liquid-crystal panel.

2. Description of the Related Art

Currently, an active matrix liquid-crystal display device represented by a TFT (thin film transistor) liquid-crystal panel is expected to spread as a display device for general household TVs and OA apparatuses. This is because such an active matrix liquid-crystal display device can be easily made thin and light compared to a CRT, and at the same time, can display no poorer image than a CRT.

In light of the advantage of being thin and light, the active matrix liquid-crystal display device is expected to be applied, not only to a portable information device such as a note PC, but to various multimedia information devices. Besides, a polysilicon LCD realizing a narrow frame is expected to become prevalent with stronger measures being implemented against an EMI (electromagnetic interference).

A description will be given hereinbelow of a structure of such an active matrix liquid-crystal display device displaying one of the highest-quality images among flat panel displays. FIG. 1 is an illustration showing a structure of the conventional liquid-crystal display device. As shown in FIG. 1, a conventional liquid-crystal display device 11 comprises a TFT substrate 1, TFTs (thin-film transistors) 2, signal lines 3, scanning lines 4, a common electrode substrate 5, a common electrode 6, a liquid-crystal layer 7, an electrode lead-out line 8, a signal-line drive circuit 9, a scanning-line drive circuit 10, and pixel electrodes 22. The TFTs 2, the signal lines 3, the scanning lines 4, the common electrode 6, the pixel electrodes 22, the liquid-crystal layer 7 provided between the pixel electrodes 22 and the common electrode 6, compose a liquid-crystal panel.

FIG. 2 is a plan view showing a panel structure in the liquid-crystal display device 11 shown in FIG. 1. As shown in FIG. 2, switching elements each consisting of the TFT 2, the signal lines 3, the scanning lines 4, and the pixel electrodes 22 each connected to the TFT 2, are formed on the TFT substrate 1. Further, as shown in FIG. 1, the signal-line drive circuit 9 driving the signal lines 3, the scanning-line drive circuit 10 driving the scanning lines 4, and the electrode lead-out line 8 are formed on peripheral parts of the TFT substrate 1. In addition, the common electrode 6 made of an ITO (a transparent electrode) or a color filter is formed on a glass substrate on the common electrode substrate 5.

Also as shown in FIG. 2, the TFTs 2 and the pixel electrodes 22 are formed in the form of a matrix on the TFT substrate 1. The signal line 3 supplies an image signal to the pixel electrode 22 via the TFT2. The scanning line 4 transmits a control signal to a gate of the TFT 2, the control signal turning on/off the TFT 2 which is connected to the pixel electrode 22 so as to regulate writing of data to each pixel. It is noted that a unit like the liquid-crystal display device 11 that drives the signal lines 3 and the scanning lines 4 so as to display an image via the pixel electrodes 22 formed in the form of a matrix is referred to as an "active matrix liquid-crystal display device".

FIG. 3 shows a cross-sectional structure of the liquid-crystal display device 11 shown in FIG. 1. As shown in FIG. 3, the signal-line drive circuit 9 and other elements are formed on the TFT substrate 1. The liquid-crystal layer 7 is provided between the common electrode 6 formed on the common electrode substrate 5 and the pixel electrodes 22 formed on the TFT substrate 1. The TFT substrate 1 is electrically connected to the common electrode substrate 5 by a transfer 14a. In addition, as shown in FIG. 3, a sealing portion 13 is provided between the TFT substrate 1 and the common electrode substrate 5 outside the transfer 14a. The electrode lead-out line 8 and a protective film 12 are formed on a part of the TFT substrate 1 not covered by the common electrode substrate 5. Signals are transmitted from the electrode lead-out line 8 to external devices by using a cable such as a flexible flat cable.

In the liquid-crystal display device 11 having the above-described structure, the TFTs 2 in a selected row are turned on so that an image-signal voltage applied to the signal line 3 is written to each of the pixel electrodes 22, and the information is retained therein by keeping the electric charge until the next time the row is selected. In this course, the inclination of liquid-crystal molecules is so determined in accordance with the retained information as to regulate the amount of light transmission, enabling a gradation display, etc. Further, for a color display, an RGB color filter is used to mix lights.

The backside of such a liquid-crystal panel as above is provided with a surface light source called backlight. Recently, however, a reflective liquid-crystal panel not requiring this backlight attracts attention in the portable information device technology. The reflective liquid-crystal panel is provided with a layer referred to as a reflective electrode, and displays an image by reflecting externally supplied lights and transmits the lights through a liquid-crystal layer.

The above-described conventional liquid-crystal display device 11 has a problem that, since only an ITO (a transparent electrode) or an insulating layer is provided above the signal-line drive circuit 9 and the scanning-line drive circuit 10 formed on peripheral parts of the TFT substrate 1, noises generated from these drive circuits cannot be reduced, which leads to an EMI (electromagnetic interference) especially in a high-frequency operation.

The same problem occurs with respect to the electrode lead-out line 8 shown in FIG. 1 and FIG. 3.

SUMMARY OF THE INVENTION

It is a general object of the present invention to provide an improved and useful liquid-crystal display device in which the above-mentioned problems are eliminated.

A more specific object of the present invention is to provide a liquid-crystal display device in which noises (electromagnetic waves) emitted outwardly can be reduced.

In order to achieve the above-mentioned objects, there is provided according to one aspect of the present invention a liquid-crystal display device comprising:

a first substrate having a pixel electrode, a signal line, a scanning line, and a driver driving one of the signal line and the scanning line;

a second substrate having a common electrode, the second substrate opposing the first substrate;

a liquid-crystal layer formed between the pixel electrode and the common electrode; and a first shield placed opposite the driver so as to shield an electromagnetic wave radiated from the driver.

Other objects, features and advantages of the present invention will become more apparent from the following detailed description when read in conjunction with the accompanying drawings.

DETAILED DESCRIPTION OF THE PREFERRED EMBODIMENTS

Figure 1:
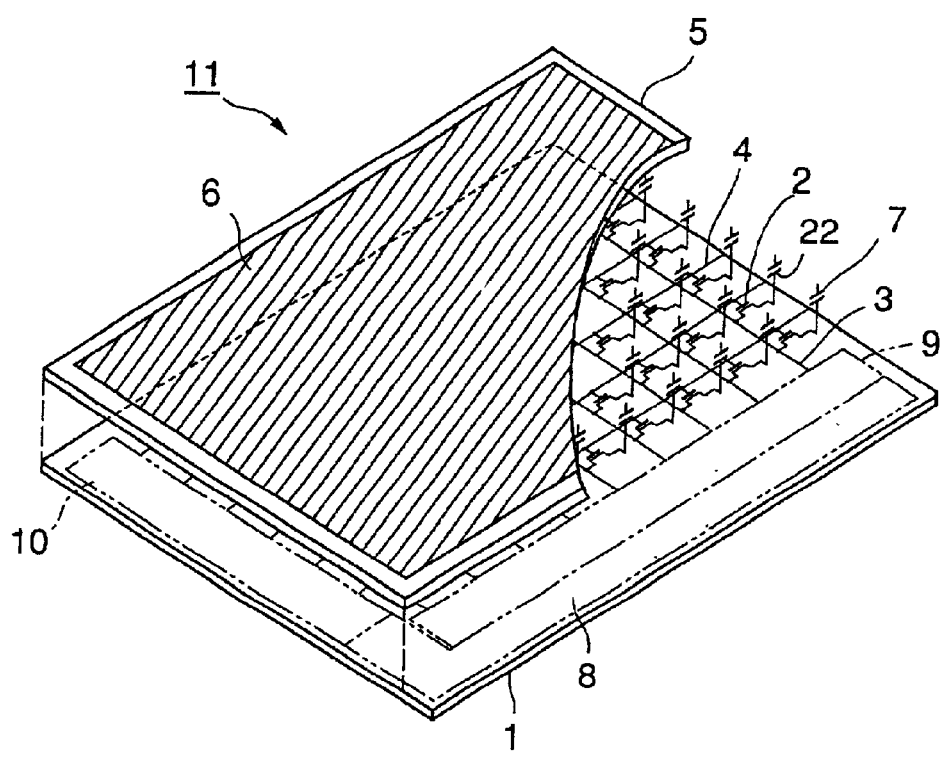
FIG. 1 is an illustration showing a structure of a conventional liquid-crystal display device.

A description will now be given, with reference to the drawings, of embodiments according to the present invention. Elements in the drawings that are identical or equivalent are referenced by the same reference marks.

Liquid-crystal display devices according to embodiments of the present invention are provided with augmented measures against an EMI (electromagnetic interference) by forming a layer of a shield electrode above the drive circuits and the electrode lead-out line formed on peripheral parts of the TFT substrate composing a liquid-crystal panel so as to reduce noises generated from these drive circuits. It is noted that stabilizing the electric potential of the shield electrode at a constant electric potential such as a ground potential enhances the shield effect, contributing effectively to the measures against the EMI. More specific descriptions will be given in the following.

[Embodiment 1]

Figure 4:
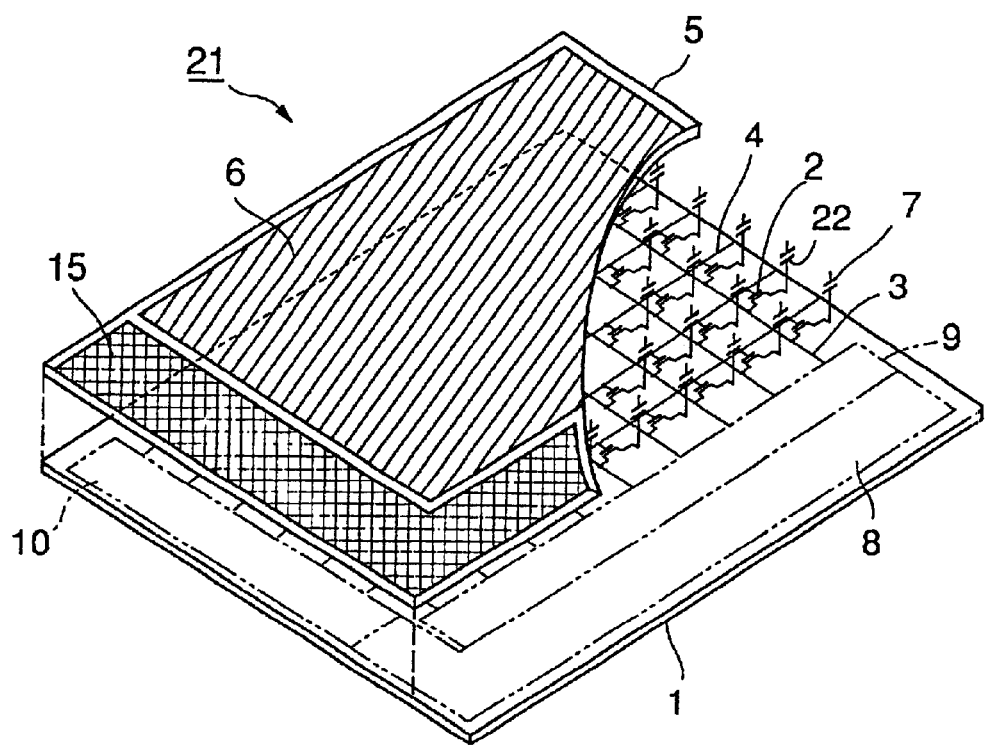
FIG. 4 is an illustration showing a structure of a liquid-crystal display device according to a first embodiment of the present invention.
Figure 5:
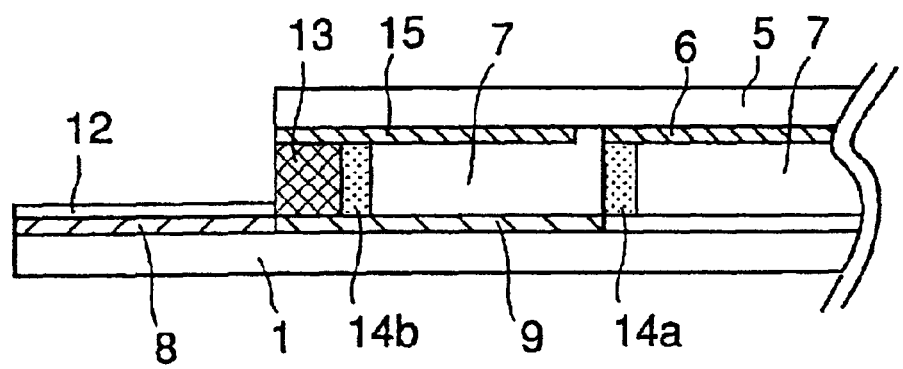
FIG. 5 shows a cross-sectional structure of the liquid-crystal display device shown in FIG. 4.

FIG. 4 is an illustration showing a structure of a liquid-crystal display device 21 according to a first embodiment of the present invention. FIG. 5 shows a cross-sectional structure of the liquid-crystal display device 21. As shown in FIG. 4, the liquid-crystal display device 21 comprises the TFT substrate (a first substrate) 1, the TFTs (thin-film transistors) 2, the signal lines 3, the scanning lines 4, the common electrode substrate (a second substrate) 5, the common electrode 6, the liquid-crystal layer 7, the electrode lead-out line 8, the signal-line drive circuit 9, the scanning-line drive circuit 10, a ground electrode (a first shield) 15, and the pixel electrodes 22. The TFTs 2, the signal lines 3, the scanning lines 4, the common electrode 6, the pixel electrodes 22, and the liquid-crystal layer 7 provided between the pixel electrodes 22 and the common electrode 6, compose a liquid-crystal panel.

In the above-mentioned structure, switching elements each consisting of the TFT 2, the signal lines 3, the scanning lines 4, and the pixel electrodes 22 each connected to the TFT 2, are formed on the TFT substrate 1. Further, the signal-line drive circuit 9 driving the signal lines 3, the scanning-line drive circuit 10 driving the scanning lines 4, and the electrode lead-out line 8 are formed on peripheral parts of the TFT substrate 1.

On the other hand, unlike the conventional liquid-crystal display device 11 shown in FIG. 1, the common electrode substrate 5 of the liquid-crystal display device 21 according to the present first embodiment is provided with the ground electrode (a shield electrode) 15 formed above the signal-line drive circuit 9 and the scanning-line drive circuit 10, along with the common electrode 6 made of an ITO (a transparent electrode) or a color filter.

Figure 2:
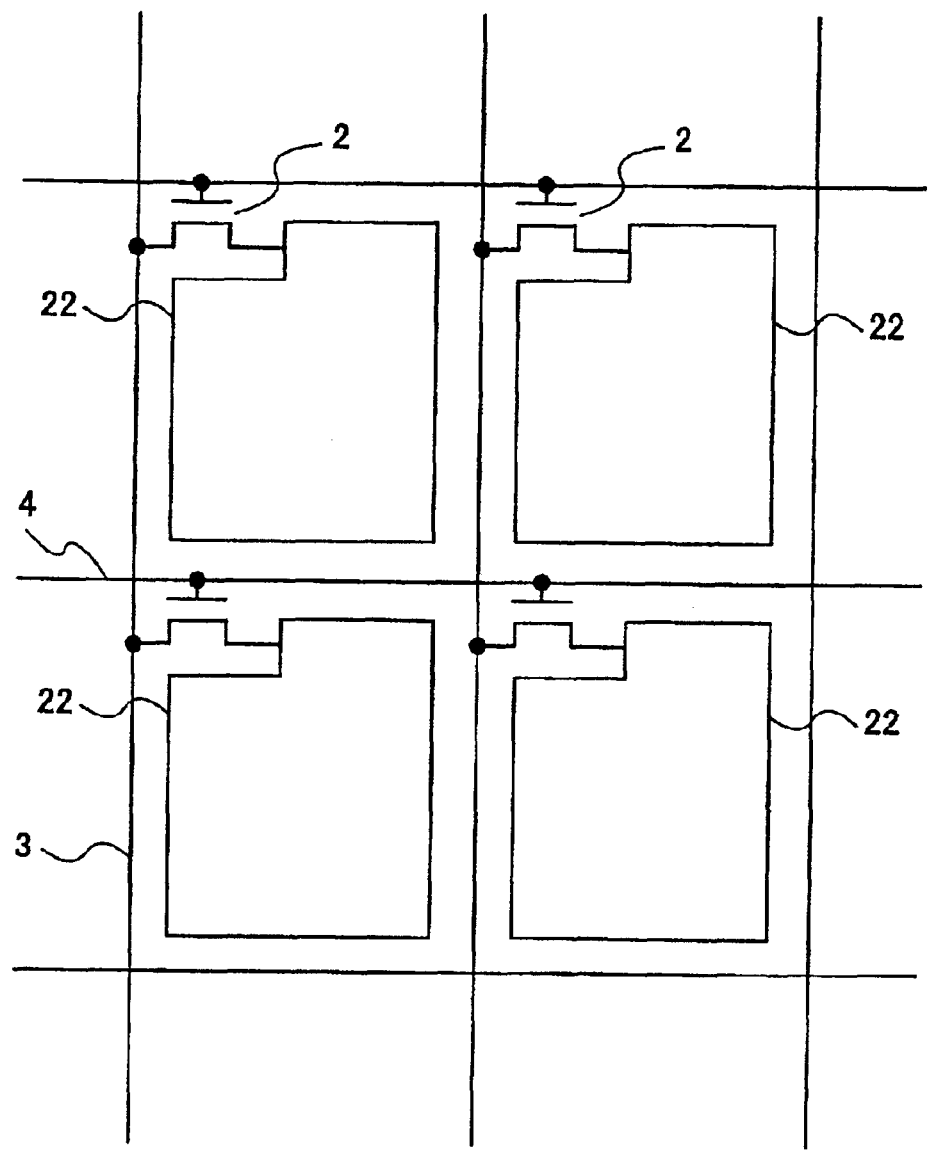
FIG. 2 is a plan view showing a panel structure in the liquid-crystal display device shown in FIG. 1.
Figure 3:
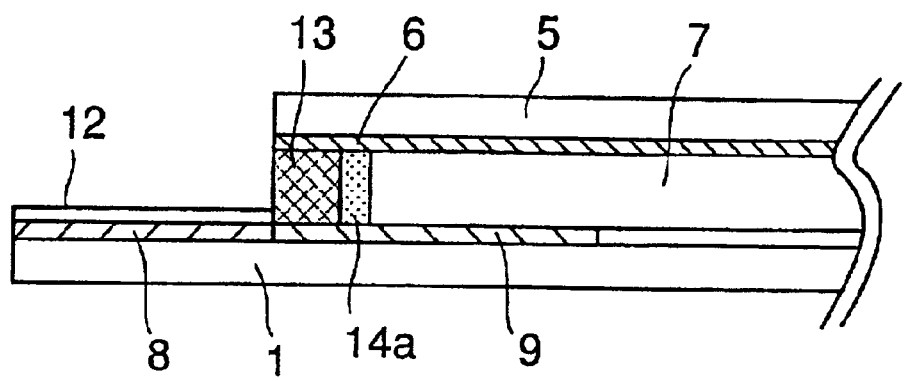
FIG. 3 shows a cross-sectional structure of the liquid-crystal display device shown in FIG. 1.

However, as in the conventional liquid-crystal display device 11 shown in FIG. 1 and FIG. 2, the TFTs 2 and the pixel electrodes 22 are formed in the form of a matrix on the TFT substrate 1. The signal line 3 supplies an image signal to the pixel electrode 22 via the TFT2. The scanning line 4 transmits a control signal to a gate of the TFT 2, the control signal turning on/off the TFT 2 which is connected to the pixel electrode 22 so as to regulate writing of data to each pixel.

As shown in FIG. 5, the common electrode 6 is supplied with a common electrode potential from the TFT substrate 1 via the transfer 14a. The ground electrode 15 is supplied with a ground potential from the TFT substrate 1 via a transfer (a voltage supplier) 14b.

In the liquid-crystal display device 21 according to the present first embodiment, the ground electrode 15 functions as a shield against electromagnetic waves generated from the signal-line drive circuit 9 and the scanning-line drive circuit 10 so as to reduce electromagnetic waves leaked to the outside of the liquid-crystal display device 21, contributing to the measures against the EMI.

[Embodiment 2]

Figure 6:
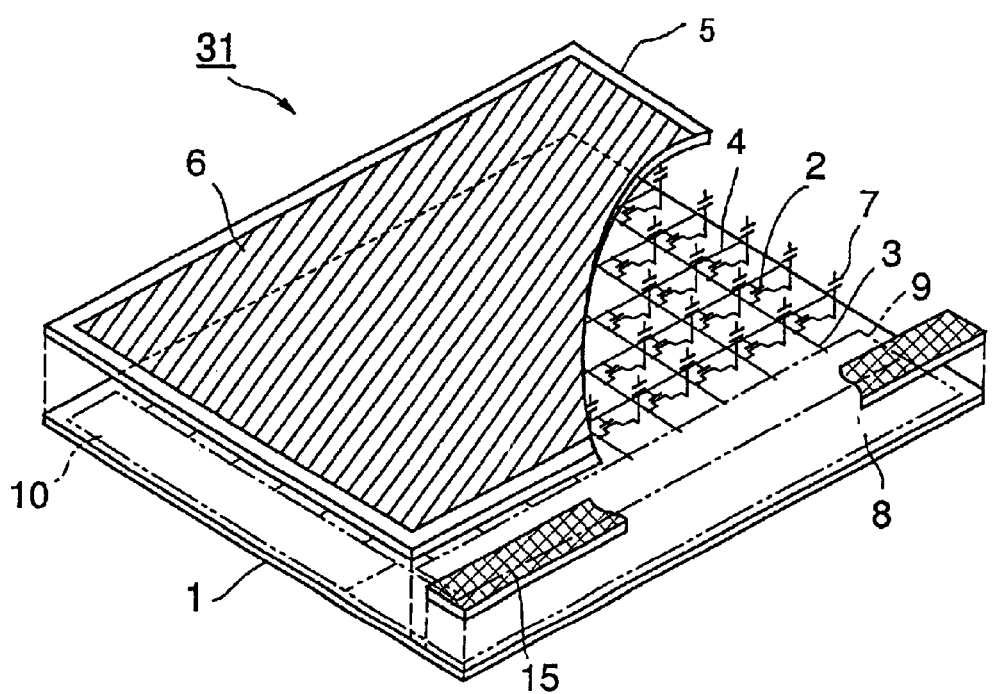
FIG. 6 is an illustration showing a structure of a liquid-crystal display device according to a second embodiment of the present invention.
Figure 7:
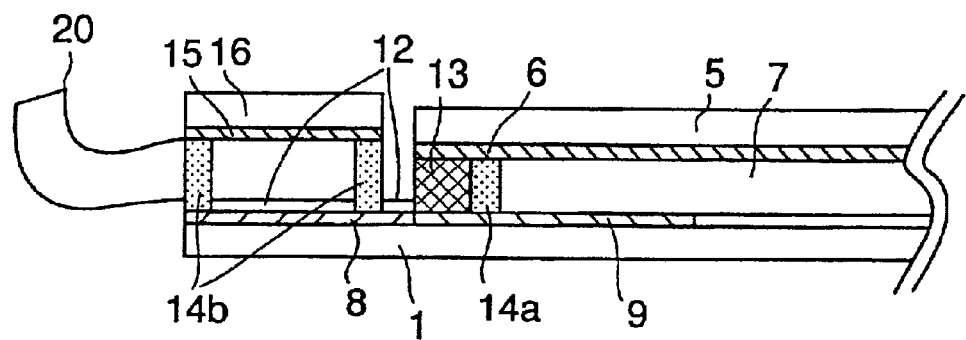
FIG. 7 shows a cross-sectional structure of the liquid-crystal display device shown in FIG. 6.

FIG. 6 is an illustration showing a structure of a liquid-crystal display device 31 according to a second embodiment of the present invention. FIG. 7 shows a cross-sectional structure of the liquid-crystal display device 31. As shown in FIG. 6, the liquid-crystal display device 31 has the same structure as the liquid-crystal display device 21 according to the above-mentioned first embodiment, except that the common electrode substrate 5 (see also FIG. 7) not having the ground electrode 15 is so provided as to cover the TFTs 2, the pixel electrodes (not shown in the figure), the signal lines 3, the scanning lines 4, the signal-line drive circuit 9 and the scanning-line drive circuit 10, and that a shield substrate (a third substrate) 16 (see FIG. 7) having the ground electrode (a first shield) 15 is further provided above the electrode lead-out line 8. The common electrode 6 is formed all across the common electrode substrate 5 not having the ground electrode 15.

Additionally, as shown in FIG. 7, a flexible flat cable 20 is applied to the electrode lead-out line 8 by pressure, and thereafter, the shield substrate 16 having the ground electrode 15 formed by using aluminum or titanium is provided above the electrode lead-out line 8 and the part where the above-mentioned flexible flat cable 20 is applied to the electrode lead-out line 8. The ground electrode 15 is supplied with a ground potential from the TFT substrate 1 via the transfer 14b. The ground electrode 15 may be electrically connected to the TFT substrate 1 by a wire bonding, etc. in place of the transfer 14b.

In this structure, since the shield substrate 16 is positioned outside a so-called display area in which the TFTs 2 and the pixel electrodes (not shown in the figure) are formed on the TFT substrate 1, the shield substrate 16 does not cause a problem of narrowing the visible range of an image. Additionally, forming the ground electrode 15 by using aluminum or titanium as mentioned above can reduce a sheet resistance of the ground electrode 15 so as to further increase the shield effect.

In the liquid-crystal display device 31 according to the present second embodiment, the ground electrode 15 formed on the shield substrate 16 functions as a shield against electromagnetic waves generated from the electrode lead-out line 8 so as to reduce electromagnetic waves leaked outwardly from the liquid-crystal display device 31; this makes the measures against the EMI more effective.

Additionally, according to the liquid-crystal display device 31 of the present second embodiment, the shield substrate 16 is a separate and independent component from the TFT substrate 1 and the common electrode substrate 5 and thus can be manufactured separately and independently. Also, the shield substrate 16 can be combined with a conventional liquid-crystal display device easily into the liquid-crystal display device according to the present second embodiment.

[Embodiment 3]

Figure 8:
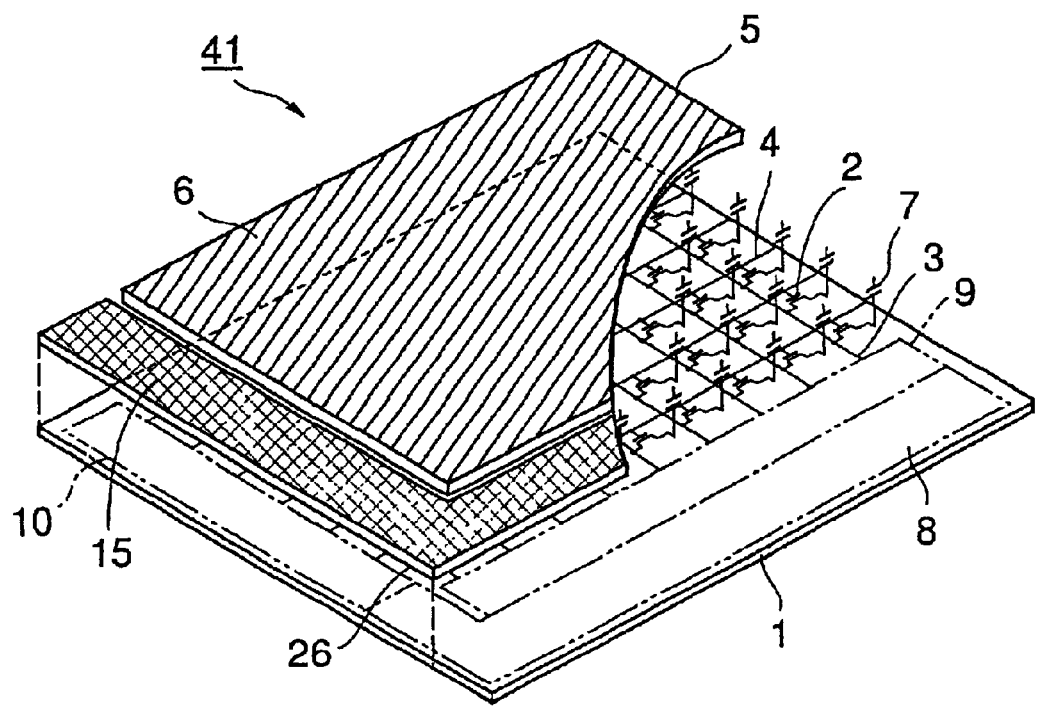
FIG. 8 is an illustration showing a structure of a liquid-crystal display device according to a third embodiment of the present invention.
Figure 9:
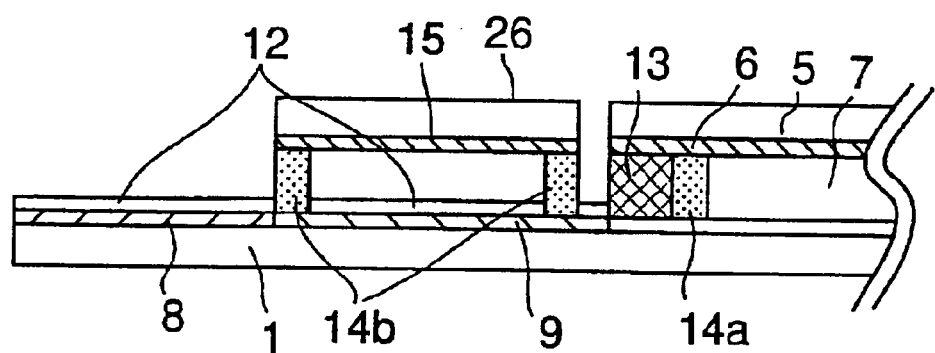
FIG. 9 shows a cross-sectional structure of the liquid-crystal display device shown in FIG. 8.

FIG. 8 is an illustration showing a structure of a liquid-crystal display device 41 according to a third embodiment of the present invention. FIG. 9 shows a cross-sectional structure of the liquid-crystal display device 41. As shown in FIG. 8, the liquid-crystal display device 41 has the same structure as the liquid-crystal display device 31 according to the above-mentioned second embodiment, except that the common electrode substrate 5 is provided above the TFTs 2, the pixel electrodes (not shown in the figure), the signal lines 3, and the scanning lines 4, and that a shield substrate (a third substrate) 26 having the ground electrode (a first shield) 15 is provided above the signal-line drive circuit 9 and the scanning-line drive circuit 10.

As shown in FIG. 9, the ground electrode 15 is supplied with a ground potential from the TFT substrate 1 via the transfer 14b, as in the liquid-crystal display device 31 according to the above-mentioned second embodiment.

In the liquid-crystal display device 41 according to the present third embodiment, the ground electrode 15 formed on the shield substrate 26 functions as a shield against electromagnetic waves generated from the signal-line drive circuit 9 and the scanning-line drive circuit 10 so as to reduce electromagnetic waves leaked from the liquid-crystal display device 41 outwardly; this makes the measures against the EMI more effective.

Additionally, as in the liquid-crystal display device 31 according to the above-mentioned second embodiment, the shield substrate 26 is a separate and independent component from the TFT substrate 1 and the common electrode substrate 5 and thus can be manufactured separately and independently. Also, the shield substrate 26 can be combined with a conventional liquid-crystal display device easily into the liquid-crystal display device according to the present third embodiment.

[Embodiment 4]

Figure 10:
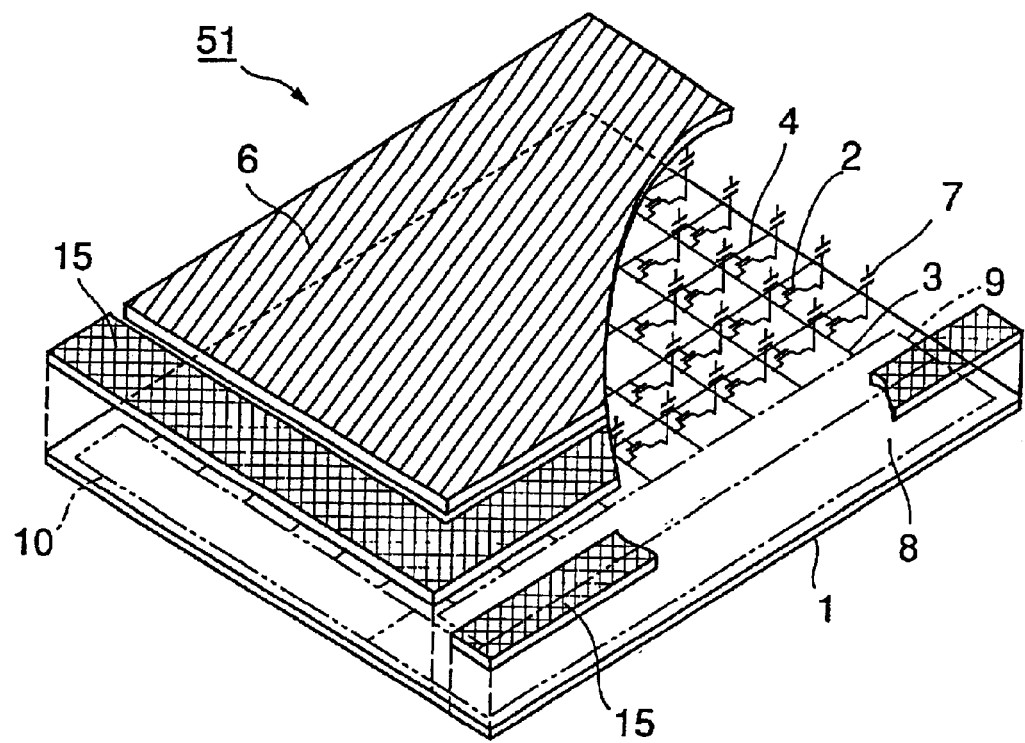
FIG. 10 is an illustration showing a structure of a liquid-crystal display device according to a fourth embodiment of the present invention.
Figure 11:
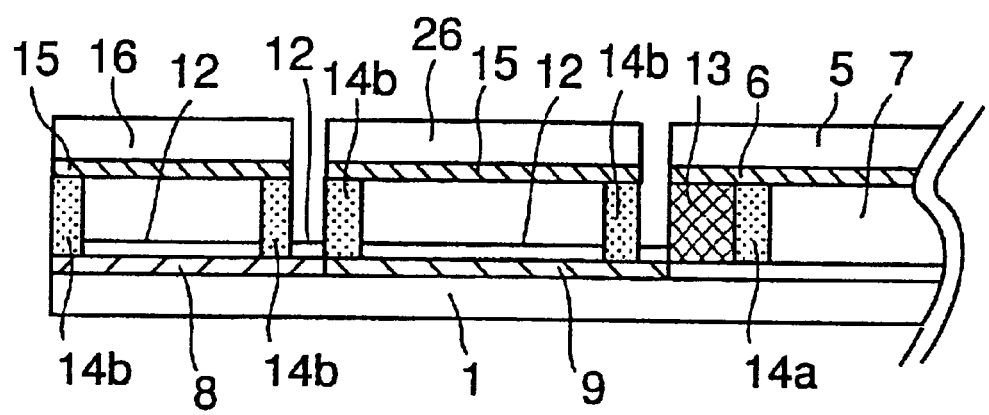
FIG. 11 shows a cross-sectional structure of the liquid-crystal display device shown in FIG. 10.

FIG. 10 is an illustration showing a structure of a liquid-crystal display device 51 according to a fourth embodiment of the present invention. FIG. 11 shows a cross-sectional structure of the liquid-crystal display device 51. As shown in FIG. 10, the liquid-crystal display device 51 has the same structure as the liquid-crystal display device 41 according to the above-mentioned third embodiment, except that the shield substrate 16 (see FIG. 11) having the ground electrode 15 is further provided above the electrode lead-out line 8.

As shown in FIG. 11, the ground electrodes 15 formed on the shield substrates 16 and 26 are supplied with a ground potential from the TFT substrate 1 via the transfers 14b, as in the liquid-crystal display devices 31 and 41 according to the above-mentioned second and third embodiments.

In the liquid-crystal display device 51 according to the present fourth embodiment, the ground electrode 15 (a first shield) formed on the shield substrate (a third substrate) 16 and the ground electrode 15 (a second shield) formed on the shield substrate (a fourth substrate) 26 function as shields against electromagnetic waves generated from the electrode lead-out line 8, the signal-line drive circuit 9 and the scanning-line drive circuit 10 so as to reduce electromagnetic waves leaked from the liquid-crystal display device 51 outwardly; this contributes to the measures against the EMI effectively. In addition, the shield substrates 16 and 26 are a separate and independent component from the TFT substrate 1 and the common electrode substrate 5 and thus can be manufactured separately and independently.

[Embodiment 5]

Figure 12:
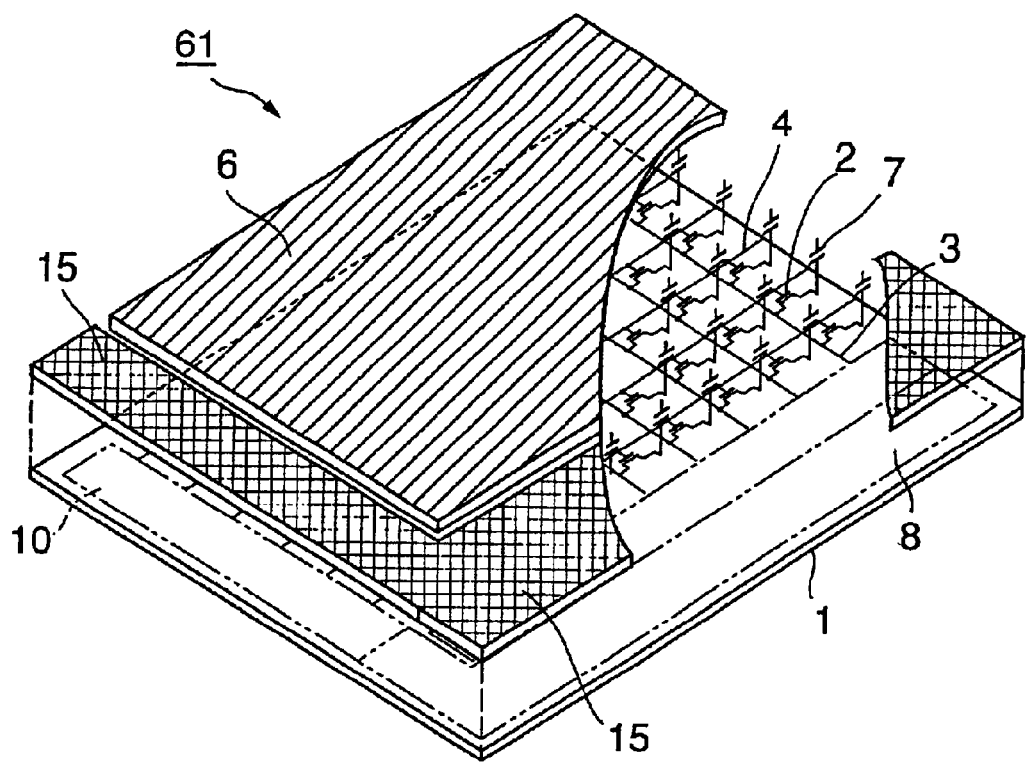
FIG. 12 is an illustration showing a structure of a liquid-crystal display device according to a fifth embodiment of the present invention.
Figure 13:
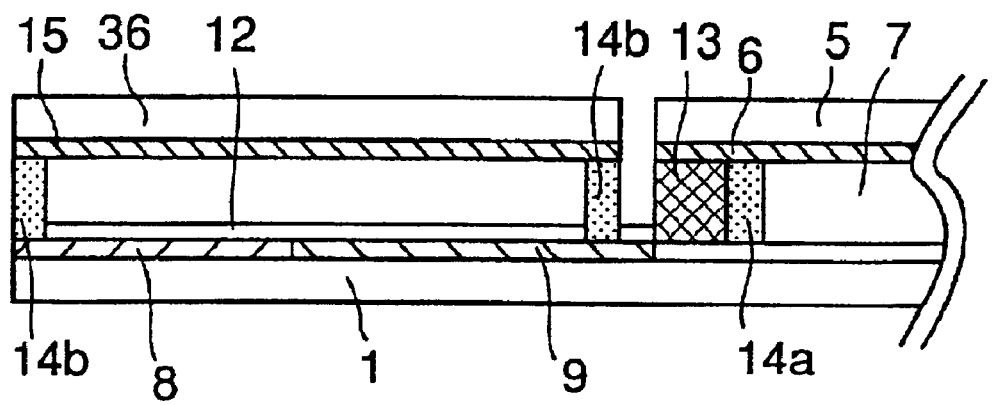
FIG. 13 shows a cross-sectional structure of the liquid-crystal display device shown in FIG. 12.

FIG. 12 is an illustration showing a structure of a liquid-crystal display device 61 according to a fifth embodiment of the present invention. FIG. 13 shows a cross-sectional structure of the liquid-crystal display device 61. As shown in FIG. 12, the liquid-crystal display device 61 has the same structure as the liquid-crystal display device 51 according to the above-mentioned fourth embodiment, except that a unitary shield substrate (a third substrate) 36 (see FIG. 13) having the ground electrode (a shield) 15 formed unitarily thereon is provided above the electrode lead-out line 8, the signal-line drive circuit 9 and the scanning-line drive circuit 10. In other words, in the liquid-crystal display device 61 according to the present fifth embodiment, the shield substrates 16 and 26 of the liquid-crystal display device 51 according to the above-mentioned fourth embodiment are unitarily formed.

As shown in FIG. 13, the ground electrode 15 formed on the shield substrate 36 is supplied with a ground potential from the TFT substrate 1 via the transfer 14b, as in the liquid-crystal display device 51 according to the above-mentioned fourth embodiment.

In the liquid-crystal display device 61 according to the present fifth embodiment, the ground electrode 15 formed on the shield substrate 36 functions as a shield against electromagnetic waves generated from the electrode lead-out line 8, the signal-line drive circuit 9 and the scanning-line drive circuit 10 so as to reduce electromagnetic waves leaked from the liquid-crystal display device 61 outwardly; this contributes to the measures against the EMI effectively.

Additionally, in the liquid-crystal display device 61 according to the present fifth embodiment, the shield substrate has a larger area such that a larger number of the transfers 14b can be provided between the shield substrate 36 and the TFT substrate 1; this increases the shield effect further.

[Embodiment 6]

Figure 14:
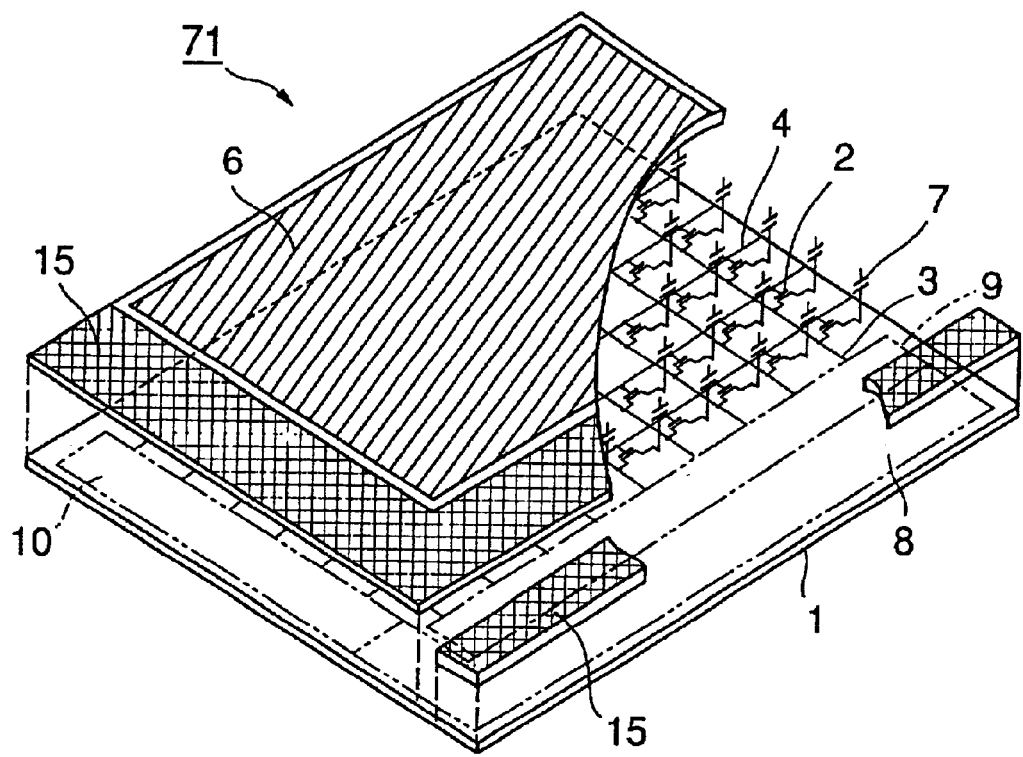
FIG. 14 is an illustration showing a structure of a liquid-crystal display device according to a sixth embodiment of the present invention.
Figure 15:
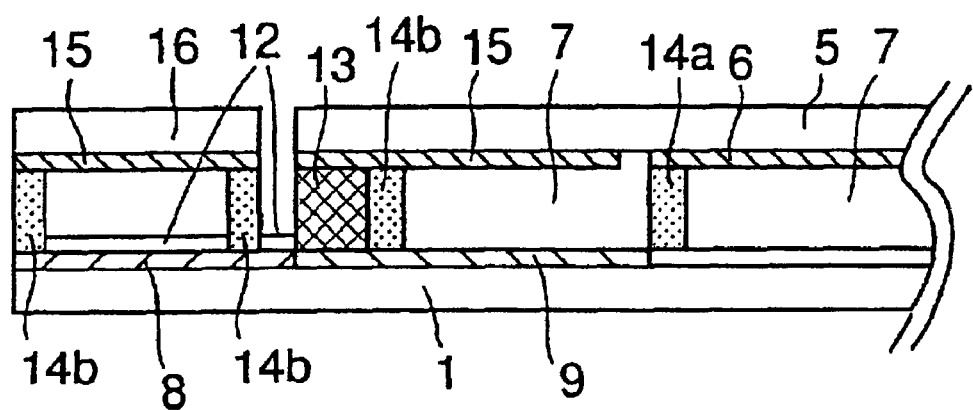
FIG. 15 shows a cross-sectional structure of the liquid-crystal display device shown in FIG. 14.

FIG. 14 is an illustration showing a structure of a liquid-crystal display device 71 according to a sixth embodiment of the present invention. FIG. 15 shows a cross-sectional structure of the liquid-crystal display device 71. As shown in FIG. 14, the liquid-crystal display device 71 has the same structure as the liquid-crystal display device 21 according to the above-mentioned first embodiment, except that the shield substrate (a third substrate) 16 (see FIG. 15) having the ground electrode (a second shield) 15 is further provided above the electrode lead-out line 8.

As shown in FIG. 15, the ground electrode 15 formed on the shield substrate 16 is supplied with a ground potential from the TFT substrate 1 via the transfer 14b, as in the liquid-crystal display devices 31 and 51 according to the above-mentioned second and fourth embodiments.

In the liquid-crystal display device 71 according to the present sixth embodiment, the ground electrodes 15 formed on the common electrode substrate 5 and the shield substrate 16 function as shields against electromagnetic waves generated from the signal-line drive circuit 9, the scanning-line drive circuit 10, and the electrode lead-out line 8 so as to reduce electromagnetic waves leaked from the liquid-crystal display device 71 outwardly; this contributes to the measures against the EMI effectively.

Besides, in the liquid-crystal display devices according to the above-described first to sixth embodiment, when the ground electrode 15 is formed of the same material as the common electrode 6, the ground electrode 15 and the common electrode 6 can be formed at the same time by the same process. Thus, the liquid-crystal display devices can be achieved without increasing the number of manufacturing steps.

Also, as mentioned above, forming the ground electrode 15 by using aluminum or titanium can reduce a sheet resistance of the ground electrode 15 so as to further increase the shield effect.

The present invention is not limited to the specifically disclosed embodiments, and variations and modifications may be made without departing from the scope of the present invention.

The present application is based on Japanese priority application No. 2001-024594 filed on Jan. 31, 2001, the entire contents of which are hereby incorporated by reference.

What is claimed is:

1. A liquid-crystal display device comprising:
a first substrate having a pixel electrode, a signal line, a scanning line, and a driver driving one of said signal line and said scanning line;
a second substrate having a common electrode, the second substrate opposing said first substrate;
a liquid-crystal layer formed between said pixel electrode and said common electrode; and
a first shield placed opposite said driver and electrically connected to said driver so as to shield an electromagnetic wave radiated from said driver.

2. The liquid-crystal display device as claimed in claim 1, wherein said first shield is formed on said second substrate.

3. The liquid-crystal display device as claimed in claim 1, wherein said first shield is formed on a third substrate separate from said first substrate and said second substrate.

4. The liquid-crystal display device as claimed in claim 2, further comprising:
an electrode lead-out line formed on said first substrate so as to input and output a signal to and from said driver; and
a second shield formed on a third substrate placed opposite said electrode lead-out line so as to shield an electromagnetic wave radiated from said electrode lead-out line, the third substrate being separate from said first substrate and said second substrate.

5. A liquid-crystal display device comprising:
a first substrate having a pixel electrode, a signal line, a scanning line, a driver driving one of said signal line and said scanning line, and an electrode lead-out line used for inputting and outputting a signal to and from said driver;
a second substrate having a common electrode, the second substrate opposing said first substrate;
a liquid-crystal layer formed between said pixel electrode and said common electrode; and
a first shield placed opposite said electrode lead-out line and electrically connected to said electrode lead-out line so as to shield an electromagnetic wave radiated from said electrode lead-out line.

6. The liquid-crystal display device as claimed in claim 5, wherein said first shield is formed on a third substrate separate from said first substrate and said second substrate.

7. The liquid-crystal display device as claimed in claim 6, further comprising a second shield formed on a fourth substrate placed opposite said driver so as to shield an electromagnetic wave radiated from said driver.

8. A liquid-crystal display device comprising:
a first substrate having a pixel electrode, a signal line, a scanning line, a driver driving one of said signal line and said scanning line, and an electrode lead-out line used for inputting and outputting a signal to and from said driver;
a second substrate having a common electrode, the second substrate opposing said first substrate;
a liquid-crystal layer formed between said pixel electrode and said common electrode; and
a shield formed unitarily on a third substrate placed opposite said driver and said electrode lead-out line and electrically connected to said driver and said electrode lead-outline, so as to shield electromagnetic waves radiated from said driver and said electrode lead-out line, the third substrate being separate from said first substrate and said second substrate.

9. The liquid-crystal display device as claimed in claim 1, further comprising a voltage supplier electrically connecting said first shield with said first substrate so as to supply a predetermined voltage to said first shield.

10. The liquid-crystal display device as claimed in claim 5, further comprising a voltage supplier electrically connecting said first shield with said first substrate so as to supply a predetermined voltage to said first shield.

11. The liquid-crystal display device as claimed in claim 8, further comprising a voltage supplier electrically connecting said shield with said first substrate so as to supply a predetermined voltage to said shield.

12. The liquid-crystal display device as claimed in claim 1, wherein said first shield is formed of a same material as said common electrode.

13. The liquid-crystal display device as claimed in claim 5, wherein said first shield is formed of a same material as said common electrode.

14. The liquid-crystal display device as claimed in claim 8, wherein said shield is formed of a same material as said common electrode.

15. The liquid-crystal display device as claimed in claim 1, wherein said first shield is formed of one of aluminum and titanium.

16. The liquid-crystal display device as claimed in claim 5, wherein said first shield is formed of one of aluminum and titanium.

17. The liquid-crystal display device as claimed in claim 8, wherein said shield is formed of one of aluminum and titanium.

* * * * *